United States Patent
You et al.

(10) Patent No.: US 9,372,613 B2
(45) Date of Patent: Jun. 21, 2016

(54) SCROLLING METHOD AND ELECTRONIC DEVICE THEREOF

(71) Applicant: Samsung Electronics Co., Ltd., Gyeonggi-do (KR)

(72) Inventors: Ho-Sung You, Gyeonggi-do (KR); Yoon-Jeong Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 307 days.

(21) Appl. No.: 14/167,034

(22) Filed: Jan. 29, 2014

(65) Prior Publication Data

US 2014/0215384 A1    Jul. 31, 2014

(30) Foreign Application Priority Data

Jan. 30, 2013    (KR) .......................... 10-2013-0010359

(51) Int. Cl.
*G06F 3/0485* (2013.01)
*G06F 3/0488* (2013.01)
*G06F 1/16* (2006.01)

(52) U.S. Cl.
CPC ............ *G06F 3/0485* (2013.01); *G06F 1/1626* (2013.01); *G06F 3/04883* (2013.01)

(58) Field of Classification Search
CPC .................................................... G06F 3/0485
USPC ........................................................ 715/784
See application file for complete search history.

(56) References Cited

U.S. PATENT DOCUMENTS

| | | | | |
|---|---|---|---|---|
| 8,751,954 B2 * | 6/2014 | Luk | ....................... | G06F 3/0485 715/774 |
| 2004/0125088 A1 * | 7/2004 | Zimmerman | ....... | G06F 3/04883 345/173 |
| 2005/0125739 A1 * | 6/2005 | Thompson | ............ | G06F 3/0481 715/778 |
| 2006/0242596 A1 * | 10/2006 | Armstrong | ............ | G06F 3/0485 715/786 |
| 2007/0236475 A1 * | 10/2007 | Wherry | ................. | G06F 3/0485 345/173 |
| 2008/0168384 A1 * | 7/2008 | Platzer | ................ | G06F 3/04845 715/784 |
| 2008/0174562 A1 * | 7/2008 | Kim | .................... | G06F 3/04886 345/173 |
| 2009/0006570 A1 * | 1/2009 | Forstall | ................. | H04L 12/587 709/206 |
| 2009/0100373 A1 * | 4/2009 | Pixley | ................. | G06F 3/03543 715/786 |
| 2009/0241038 A1 * | 9/2009 | Izuno | ...................... | A63F 13/04 715/757 |
| 2009/0265658 A1 * | 10/2009 | Klishko | ................ | G06F 3/0416 715/786 |
| 2010/0017872 A1 * | 1/2010 | Goertz | ................... | G06F 3/0481 726/16 |
| 2010/0188268 A1 * | 7/2010 | Grignani | ............... | G06F 3/0485 341/22 |
| 2010/0201644 A1 * | 8/2010 | Ohshita | ............... | G06F 3/04883 345/173 |
| 2010/0231546 A1 * | 9/2010 | Digon | ................... | G06F 3/0362 345/173 |
| 2010/0295781 A1 * | 11/2010 | Alameh | ................ | G06F 3/0346 345/158 |
| 2011/0007014 A1 * | 1/2011 | Chang | ................... | G06F 3/0485 345/173 |
| 2011/0025627 A1 * | 2/2011 | Sakai | .................... | G06F 3/0485 345/173 |
| 2011/0039003 A1 | 2/2011 | Gotoh et al. | | |

(Continued)

FOREIGN PATENT DOCUMENTS

JP    09-152856 A    6/1997
JP    2010-176441 A    8/2010

(Continued)

*Primary Examiner* — Reza Nabi
(74) *Attorney, Agent, or Firm* — Cha & Reiter, LLC.

(57) ABSTRACT

A method and an electronic device for scrolling a display on a touchscreen are disclosed. The scrolling method for the electronic device includes setting a scroll direction based on a first touch input movement direction, and scrolling a display image in the scroll direction, based on a second touch input movement distance, irrespective of a second touch input movement direction.

12 Claims, 19 Drawing Sheets

(56) References Cited

U.S. PATENT DOCUMENTS

| | | | | |
|---|---|---|---|---|
| 2011/0119620 | A1* | 5/2011 | Schon | G06F 3/0416 715/785 |
| 2011/0122159 | A1* | 5/2011 | Bergsten | G06F 3/0482 345/684 |
| 2011/0252362 | A1* | 10/2011 | Cho | G06F 3/0485 715/784 |
| 2012/0127208 | A1* | 5/2012 | Jo | G06F 3/0488 345/684 |
| 2012/0167002 | A1* | 6/2012 | Torigoe | G06F 3/0488 715/784 |
| 2013/0076674 | A1* | 3/2013 | Lee | G06F 3/041 345/173 |
| 2013/0132889 | A1* | 5/2013 | Takayasu | G06F 3/0485 715/784 |
| 2013/0283204 | A1* | 10/2013 | Pasquero | G06F 3/0484 715/784 |
| 2014/0215384 | A1* | 7/2014 | You | G06F 3/04883 715/784 |
| 2014/0300543 | A1* | 10/2014 | Kim | G06F 3/04883 345/157 |
| 2015/0205474 | A1* | 7/2015 | Donelan | G06F 3/0483 715/784 |
| 2015/0205475 | A1* | 7/2015 | Donelan | G06F 3/0483 715/784 |

FOREIGN PATENT DOCUMENTS

| | | |
|---|---|---|
| JP | 2010-182197 A | 8/2010 |
| JP | 2012-501496 A | 1/2012 |
| JP | 2012-123564 A | 6/2012 |
| KR | 10-2007-0064869 A | 6/2007 |
| KR | 10-2011-0005386 A | 1/2011 |
| KR | 10-2012-0005094 A | 1/2012 |
| KR | 10-2013-0031762 A | 3/2013 |

* cited by examiner

SCROLLING METHOD AND ELECTRONIC DEVICE THEREOF

CROSS REFERENCE TO RELATED APPLICATION

This application claims priority under 35 U.S.C. §119 to an application filed in the Korean Intellectual Property Office on Jan. 30, 2013 and assigned Serial No. 10-2013-0010359, the contents of which are incorporated herein by reference.

TECHNICAL FIELD

The present disclosure relates generally to electronic devices, and more particularly, to a scrolling method and an electronic device thereof.

BACKGROUND

Portable electronic devices require user interfaces that enable users to easily access various services for the purpose of satisfying their various desires.

The portable electronic device needs user interfaces considering limited display areas because the limited display areas are needed for increasing portability. For example, if a portion of content that a user wants to see is displayed on the display unit of a portable electronic device, the portable electronic device provides a user interface that enables the user to scroll that content so that he/she may see another portion of the content that is not displayed.

When a touch screen is used, the portable electronic device may scroll content to respond to the touch information sensed through the touch screen. For example, if a drag operation on the touch screen (a touch input→a touch move→a touch release is sensed, the portable electronic device may scroll content based on a drag direction and a drag distance.

However, when there are a lot of areas that are not displayed on the display unit of the portable electronic device, there is inconvenience that a user of the portable electronic device needs to repetitively perform the same touch input for a scroll operation. For example, when a portion of E-book content that includes a plurality of pages is displayed on the display unit of the portable electronic device, there is inconvenience that a user of the portable electronic device needs to repetitively perform a drag operation (which might include a first touch input, then a second touch move, then a third touch release) to see areas that are not displayed.

SUMMARY

The present invention provides a device and method for efficiently scrolling a screen in an electronic device.

The present invention provides a device and method for simplifying user's operations for scrolling a screen in an electronic device.

The present invention provides a device and method for simplifying user's touch input procedures for scrolling a screen in an electronic device including a touch screen.

The present invention provides a device and method for scrolling a screen based on a touch move distance in an electronic device including a touch screen.

The present invention provides a device and method for scrolling a screen in a fixed direction based on a touch move distance in an electronic device including a touch screen.

The present invention provides a device and method for determining a fixed scroll direction based on an angle between a first touch point for scrolling and a second touch point for a fixed scroll mode switch in an electronic device including a touch screen.

The present invention provides a scrolling method for an electronic device that includes setting a scroll direction based on a first touch input movement direction, and scrolling a displayed image in the scroll direction based on a second touch input movement distance irrespective of a second touch input movement direction.

Setting the first scroll direction may include sensing a first touch input, setting a reference area based on a first touch input, and setting the scroll direction based on the first touch input movement direction if the first touch input location is moved out of the reference area.

Setting a scroll interval as a full page in response to a reversal of the second touch input movement direction relative to the first touch input movement direction.

According to another aspect of the present invention, a fixed scrolling method for an electronic device includes detecting based on a touch duration for a first touch input whether a fixed scroll switch event occurs, setting a scroll direction in response to the first touch input being maintained statically for a reference time, and scrolling a display image in the scroll direction based on a second touch input movement distance irrespective of a second touch input movement direction.

According to another aspect of the present invention, an electronic device includes a touch screen, and at least one processor, wherein the processor is configured to set a scroll direction based on a first touch input movement move direction, and scroll a display image in the scroll direction based on a first touch input movement distance irrespective of the second touch input movement direction.

The processor may be configured to set a reference area based on a first touch input location, and set the scroll direction based on the first touch input movement direction if the first touch input location moves out of the reference area.

According to another aspect of the present invention, an electronic device includes a touch screen, and at least one processor. The processor is configured to set a scroll direction based on a first touch input movement direction, and scroll a displayed image in the scroll direction based on a second touch input movement distance irrespective of a second touch input movement direction.

BRIEF DESCRIPTION OF THE DRAWINGS

The above features and advantages of the present invention will become more apparent from the following detailed description when taken in conjunction with the accompanying drawings in which.

DETAILED DESCRIPTION

Example embodiments of the present invention are described below in detail with reference to the accompanying drawings. When describing the present disclosure, detailed descriptions related to well-known functions or configurations will be ruled out in order not to unnecessarily obscure subject matters of the present disclosure. In addition, since the terms are defined in consideration of functions in the present disclosure, they may vary depending on an operator intention or practice. Therefore, the definition needs to be made based on details in various embodiments of the present disclosure.

A technology for scrolling a screen in an electronic device is described below.

In the following description, the electronic device may include at least one of a mobile communication terminal having a touch screen, a personal digital assistant (PDA), a PC, a laptop computer, a smart phone, a net book, a TV, a mobile internet device (MID), an ultra mobile PC (UMPC), a tablet PC, a navigation device, a smart TV, a digital camera, and an MP3 player.

In the following description, a touch indicates a state when a touch input is sensed, and may be referred to as a "touch down." A touch release indicates a state when the touch input is finished, and may be referred to as a "touch up." A "touch move" may indicate a state when a point of touch contact moves while the touch contact is maintained, and may be referred to as a "touch travel."

Figure 1:
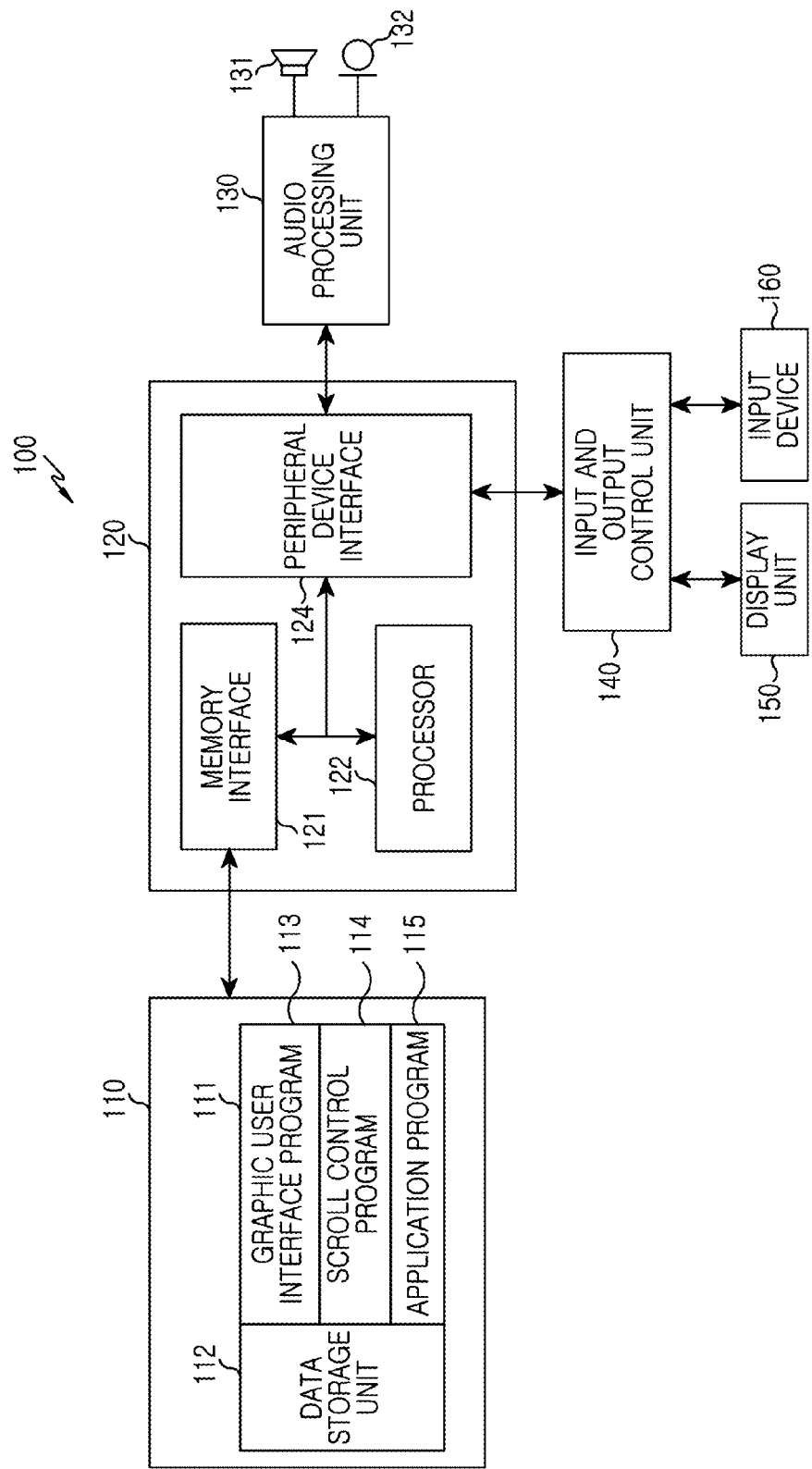
FIG. 1 is a block diagram of an example electronic device according to various embodiments of the present invention.

FIG. 1 is a block diagram of an electronic device according to an embodiment of the present invention.

Referring to FIG. 1, an electronic device 100 includes a memory 110, a processor unit 120, an audio processing unit 130, an input and output control unit 140, a display module 150, and an input device 160. In this example, the memory 110 may also be in plural forms.

The memory 110 includes a program storage unit 111 storing programs for controlling the operations of the electronic device 100, and a data storage unit 112 storing data generated during the execution of the programs.

The program storage unit 111 includes a graphic user interface (GUI) program 113, a scroll control program 114, and at least one application program 115. In this example, the programs included in the program storage unit 111 indicate a set of instructions and may be represented by an instruction set.

The GUI program 113 includes at least one software component for providing a user interface by using graphics. For example, the GUI program 113 may control the display unit 150 so that information on an application program executed by the processor 122 is displayed on the display unit 150.

The scroll control program 114 includes at least one software component for scrolling a screen based on touch information. For example, when a fixed scroll mode is set, the scroll control program 114 controls the screen so that the screen is scrolled in a fixed scroll direction based on a touch move distance. In this case, the scroll control program 114 may determine, as the fixed scroll direction, a touch move direction taken when a touch move is sensed.

As another example, if the touch move is sensed, the scroll control program 114 controls the screen so that the screen is scrolled based on the touch move direction and distance. If a touch point gets out of a reference area due to the touch move, the scroll control program 114 may switch a scroll mode to the fixed scroll mode. In this case, the scroll control program 114 controls the screen so that the screen is scrolled in the fixed scroll direction based on the touch move distance. In this case, the scroll control program 114 may determine the fixed scroll direction based on a scroll direction taken before the touch point gets out of the reference area. If a touch is sensed, the scroll control program 114 may set the reference area on a location spaced by a reference distance from the touch point based on a scrollable direction. For example, if it is possible to perform a vertical scroll operation, the scroll control program 114 may set the reference area on a location spaced horizontally by the reference distance from the touch point. If it is possible to perform a horizontal scroll operation, the scroll control program 114 may set the reference area on a location spaced vertically by the reference distance from the touch point. In this example, the reference distance may be set based on the number of reference pixels or dots per inch (DPI).

In another example, if the touch move is sensed, the scroll control program 114 controls the screen so that the screen is scrolled based on the touch move direction and distance. After the touch move, if a touch input is maintained that exceeds a reference time, the scroll control program 114 switches the scroll mode to the fixed scroll mode. Here, the scroll control program 114 controls the screen so that the screen is scrolled in the fixed scroll direction based on the touch move distance. In this case, the scroll control program 114 may determine the fixed scroll direction based on a direction at the specific touch point touch-maintained for the reference time for a first touch point where the touch is sensed.

In yet another example, if the touch move is sensed, the scroll control program 114 controls the screen so that the screen is scrolled based on the touch move direction and distance. After the touch move, if the touch is maintained for a time that exceeds the reference time, the scroll control program 114 determines the fixed scroll mode based on the scroll direction taken before the touch duration was maintained for the reference time. If the touch move is subsequently sensed, the scroll control program 114 controls the screen so that scrolling is selectively provided in the fixed scroll direction based on an angle of the touch move. For example, if the angle of the touch move is larger than a reference angle, the scroll control program 114 controls the screen so that the screen is scrolled in the fixed scroll direction based on the touch move distance.

Additionally, the scroll control program 114 may also determine a scroll control variable based on touch move information. In this example, the touch move information may include at least one of a touch move speed, an area where the touch move is sensed, and a touch move angle, and the scroll control variable may include at least one of a scroll interval and a scroll speed.

The application program 115 includes a software component for at least one application program that is installed in the electronic device 100.

The processor unit 120 includes a memory interface 121, at least one processor 122, and a peripheral device interface 124. In this example, the memory interface 121, at least one processor 122, and the peripheral device interface 124 that are included in the processor unit 120 may be in at least one integrated circuit or implemented as separate components.

The memory interface 121 controls so that components such as a processor 122 or a peripheral device interface 123 access the memory 110.

The peripheral device interface 124 controls the coupling between the input and output peripheral device of the electronic device 100 and the processor 122 or the memory interface 121.

The processor 122 uses at least one software program so that the electronic device 100 provides various multimedia services. In this case, the processor 122 executes at least one program stored in the memory 110 and provides a service corresponding to that program. For example, the processor 122 may execute the scroll control program 114 so that the scroll is scrolled based on touch information.

The audio processing unit 130 provides an audio interface between a user and the electronic device 100 through a speaker 131 and a microphone 132.

The input and output control unit 140 provides an interface between input and output devices, such as the display unit 150 and the input device 160, and the peripheral device interface 124.

The display unit 150 displays state information on the electronic device 100, texts input by the user, moving pictures and still images. For example, the display unit 150 displays information on an application program executed by the processor 122.

The input device 160 provides input data generated by user selection to the processor 120 through the input and output control unit 140. In this case, the input device 160 includes a key pad including at least one hardware button and a touch pad sensing touch information. For example, the input device 160 provides touch information such as the touch, the touch move, and the touch release, that is sensed through the touch pad, to the processor 122 through the input and output control unit 140.

Additionally, the electronic device 100 may include a communication system that performs communication functions for voice communication and data communication. In this case, the communication system may be divided into a plurality of communication sub modules that support different communication networks. For example, the communication includes, but is not limited to, a global system for mobile communication (GSM) network, an EDGE network a code division multiple access (CDMA) network, a W-CDMA network, a long term evolution (LTE) network, an orthogonal frequency division multiple access (OFDMA) network, a wireless LAN, a Bluetooth network, and near field communication (NFC).

Figure 2:
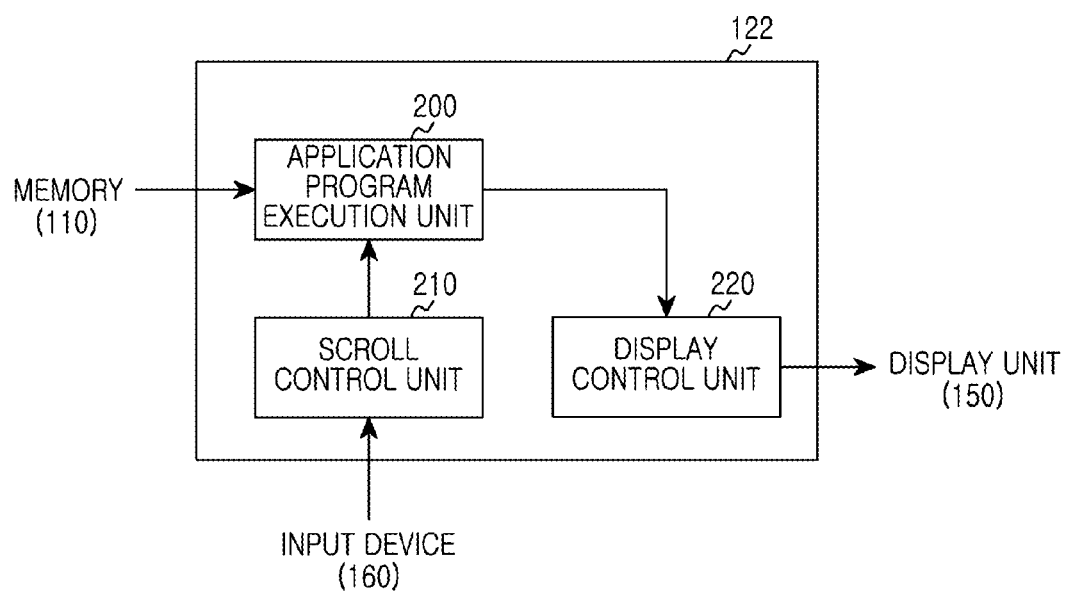
FIG. 2 is a detailed block diagram of a processor according to an example embodiment of the present invention.

FIG. 2 is a detailed block diagram of a processor according to an embodiment of the present invention.

Referring to FIG. 2, the processor 122 includes an application program execution unit 200, a scroll control unit 210, and a display control unit 220.

The application program execution unit 200 executes at least one program 115 stored in the program storage unit 111 (from FIG. 1) and provides a service corresponding to that application program. In this case, the application program execution unit 200 may provide a scroll service for that application program based on scroll control information provided from the scroll control unit 210.

The scroll control unit 210 executes the scroll control program 114 stored in the program storage unit 111 (from FIG. 1) and controls the screen so that the screen is scrolled based on touch information. For example, when a fixed scrolling mode is set, the scroll control unit 210 controls the screen so that the screen is scrolled in the fixed scroll direction based on a touch move distance. In this case, the scroll control unit 210 determines a touch move direction taken when a touch move is sensed, as the fixed scroll direction.

As another example, if the touch move is sensed, the scroll control unit 210 controls the screen so that the screen is scrolled based on the touch move direction and distance. If a touch point gets out of a reference area due to the touch move, the scroll control unit 210 switches a scrolling mode to the fixed scroll mode. If the scroll mode is switched to the fixed scrolling mode, the scroll control unit 210 controls the screen so that the screen is scrolled in the fixed scroll direction based on the touch move distance. In this case, the scroll control unit 210 may determine the fixed scroll direction based on a scrolling direction taken before the touch point gets out of the reference area. If a touch is sensed, the scroll control unit 210 may set the reference area on a location spaced by a reference distance from the touch point based on a scrollable direction. In this example, the reference distance may be set based on the number of reference pixels or dots per inch (DPI).

As another example, if the touch move is sensed, the scroll control unit 210 controls the screen so that the screen is scrolled based on the touch move direction and distance. After the touch move, if a touch duration is maintained exceeding a reference time, the scroll control unit 210 switches the scroll mode to the fixed scrolling mode. If the scroll mode is switched to the fixed scrolling mode, the scroll control unit 210 controls the screen so that the screen is scrolled in the fixed scroll direction based on the touch move distance. In this case, the scroll control unit 210 may determine the fixed scroll direction based on a direction where the specific touch point is maintained for the reference.

As another example, if the touch move is sensed, the scroll control unit 210 controls the screen so that the screen is scrolled based on the touch move direction and distance. After the touch move, if the touch duration for the specific touch point exceeds the reference time while the touch is maintained, the scroll control unit 210 determines the fixed scroll direction based on the scroll direction taken before the touch duration is maintained for the reference time. If the touch move is subsequently sensed, the scroll control unit 210 controls the screen so that scrolling is selectively provided in the fixed scroll direction based on an angle depending on the touch move. For example, if the angle depending on the touch move is larger than a reference angle, the scroll control unit 210 controls the screen so that the screen is scrolled in the fixed scrolling direction based on the touch move distance.

Additionally, the scroll control unit 210 may also determine a scroll control variable based on touch move information. In this example, the touch move information may include at least one of a touch move speed, an area where the touch move is sensed, and a touch move angle, and the scroll control variable may include at least one of a scroll interval and a scroll speed.

The display control unit 220 executes the GUI program 113 stored in the program storage unit 111 (from FIG. 1) and controls the GUI program 113 so that a user interface is displayed with graphics. For example, the display control 220 controls the display unit 150 so that information on an application program executed by the processor 200 is displayed on the display unit 150.

In the above-described embodiment, the electronic device 100 may perform a scroll operation on the application program execution unit 200 based on scroll information determined by the scroll control unit 210.

In another embodiment, the electronic device 100 may be configured so that the application program execution unit 200 determines the scroll mode based on touch information and performs the scroll operation.

Figure 3:
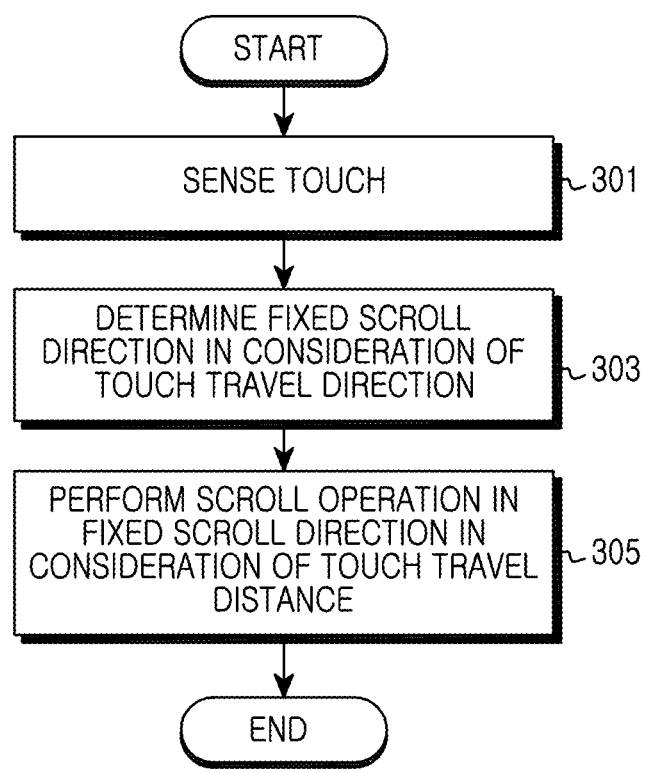
FIG. 3 is a flow chart of a procedure of scrolling a screen in an example electronic device according to an embodiment of the present invention.

FIG. 3 is a flow chart of a procedure of scrolling a screen in an electronic device according to an embodiment of the present invention.

Referring to FIG. 3, the electronic device senses a touch in step 301. For example, the electronic device senses a touch by user's fingers or a touch pen through the touch pad of the input device 160.

If the touch is sensed, the electronic device determines a fixed scroll direction based on a touch move direction in step 303. For example, the electronic device determines the fixed scroll direction based on the touch move direction taken when a move for the touch sensed in step 301 is sensed. As another example, if a touch point gets out of a reference area due to the move for the touch sensed in step 301, the electronic device may the fixed scroll direction based on a scroll direction taken before the touch point gets out of the reference area.

If the fixed scrolling mode is determined, the electronic device scrolls a screen in the fixed scroll direction based on a touch move distance. In this case, the electronic device scrolls the screen in the fixed scroll direction based on the touch move distance without considering the touch move direction. Therefore, the screen may be scrolled in a direction completely unrelated to the actual direction indicated by the touch move direction.

As described above, the electronic device may scroll the screen in the fixed scroll direction based on the touch move distance. In this case, the electronic device may determine a scroll control variable based on touch move information. For example, if the touch move is sensed, the electronic device determines the scroll control variable based on the touch move information. Subsequently, the electronic device scrolls the screen in the fixed scroll direction based on the scroll control variable and the touch move distance. In this example, the touch move information may include at least one of a touch move speed, an area where the touch move is sensed, and a touch move angle, and the scroll control variable may include at least one of a scroll interval and a scroll speed.

Figure 4:
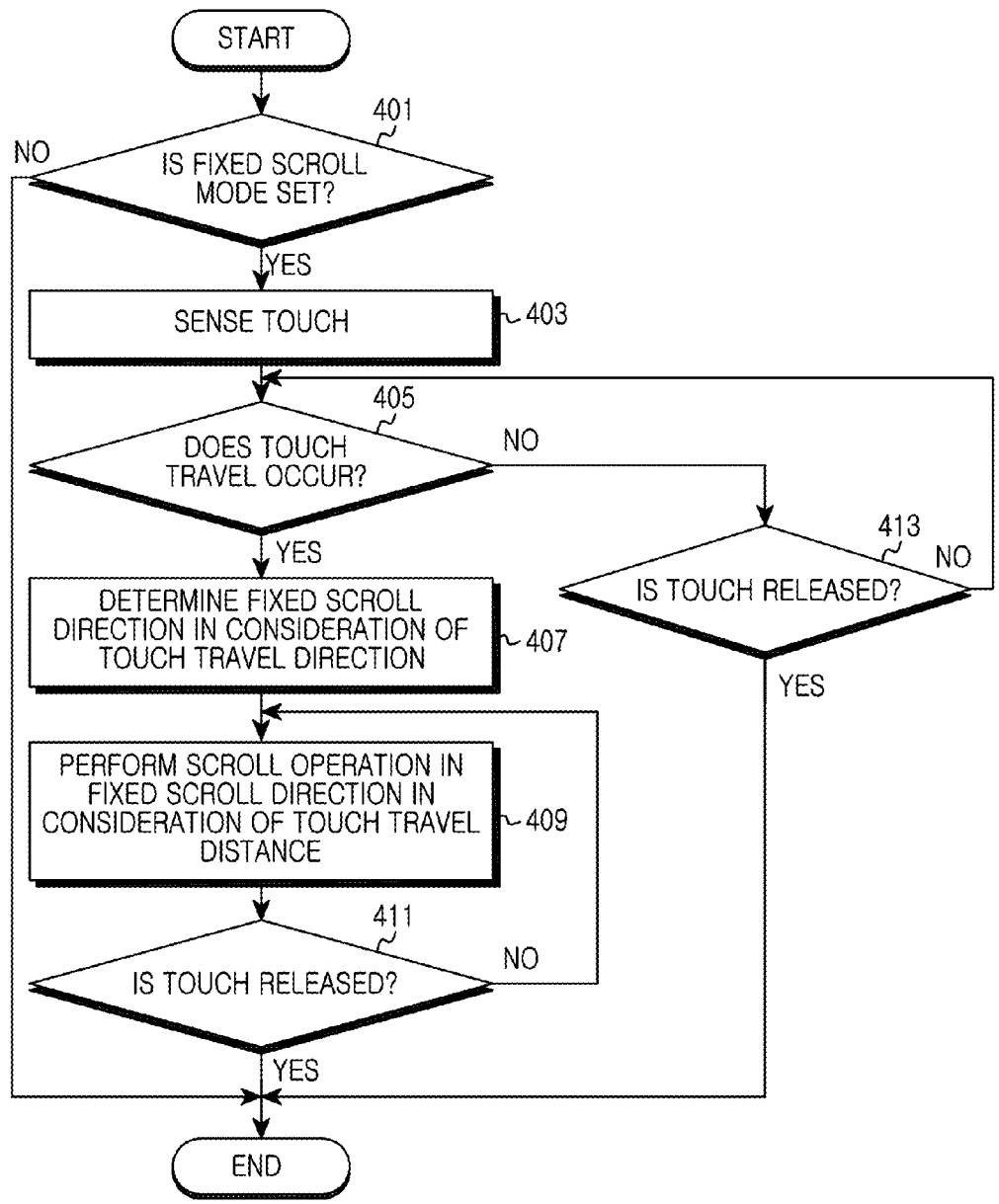
FIG. 4 is a flow chart of a procedure of scrolling a screen based on a touch move in an example electronic device according to an embodiment of the present invention.

FIG. 4 is a flow chart of a procedure of scrolling a screen based on a touch move in an electronic device according to a first embodiment of the present invention.

Referring to FIG. 4, the electronic device checks whether a fixed scroll mode is set, in step 401. For example, the electronic device may check through a menu configuration whether the fixed scroll mode is set.

If the fixed scroll mode is not set, the electronic device may terminate the present algorithm. For example, the electronic device may scroll a screen based on a touch move direction and a touch move distance.

On the other hand, if the fixed scroll mode is set, the electronic device senses a touch in step 403. For example, the electronic device senses a touch by user's fingers or a touch pen through the touch pad of an input device 160.

Figure 5A:
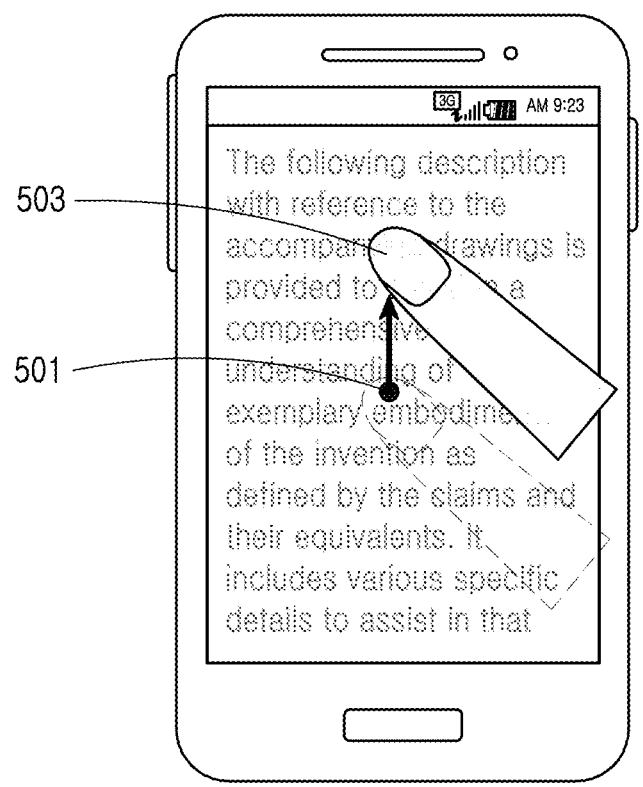
FIG. 5A, FIG. 5B, FIG. 5C, FIG. 5D and FIG. 5E illustrate example screen configurations for scrolling a screen based on a touch move in an electronic device according to an embodiment of the present invention.

If the touch is sensed, the electronic device checks whether a touch move is sensed in step 405. For example, the electronic device checks whether a first touch point 501 sensed in step 403 varies due to the touch move as shown in FIG. 5A.

If the touch move is not sensed, the electronic device checks whether a touch is released in step 413.

If the touch is released, the electronic device recognizes that a scroll operation is not performed. Thus, the electronic device may terminate the present algorithm.

On the other hand, if the touch is not released in step 413, the electronic device checks whether the touch move is sensed in step 405.

On the other hand, if the touch move is sensed, the electronic device determines a fixed scroll direction based on a touch move direction in step 407. In this case, the electronic device may determine the fixed scroll direction based on the touch move direction taken when the touch move is sensed. For example, as shown in FIG. 5A, if the first touch point 501 varies to a second touch point 503 due to the touch move, the electronic device may determine the fixed scroll direction as an upward direction. That is, the electronic device determines that a scroll up operation is performed according to the fixed scroll mode.

Figure 5B:
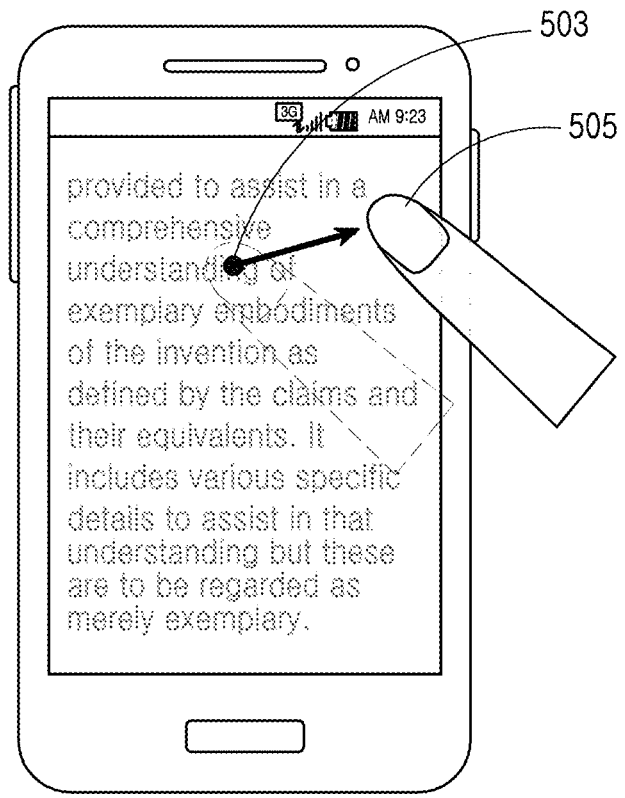
Figure 5C:
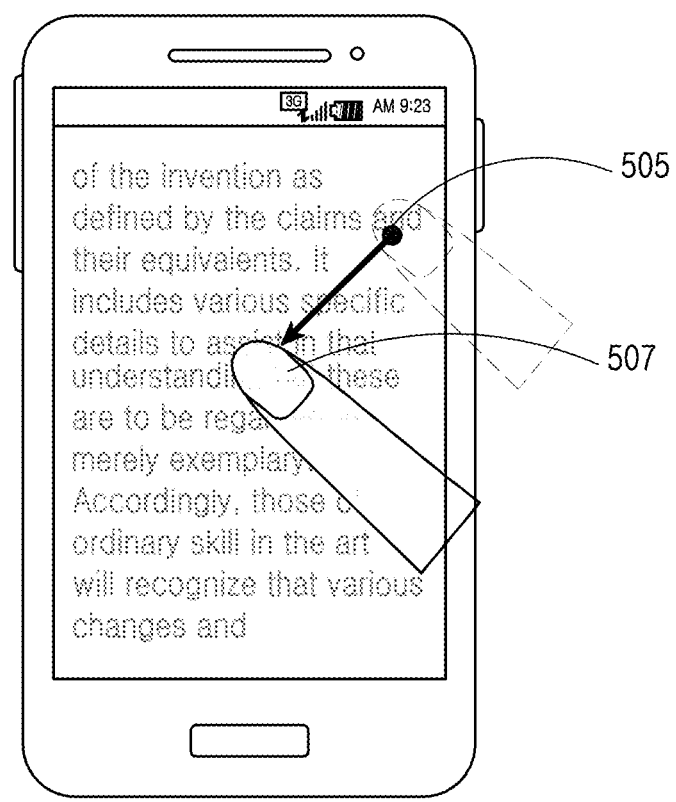
Figure 5D:
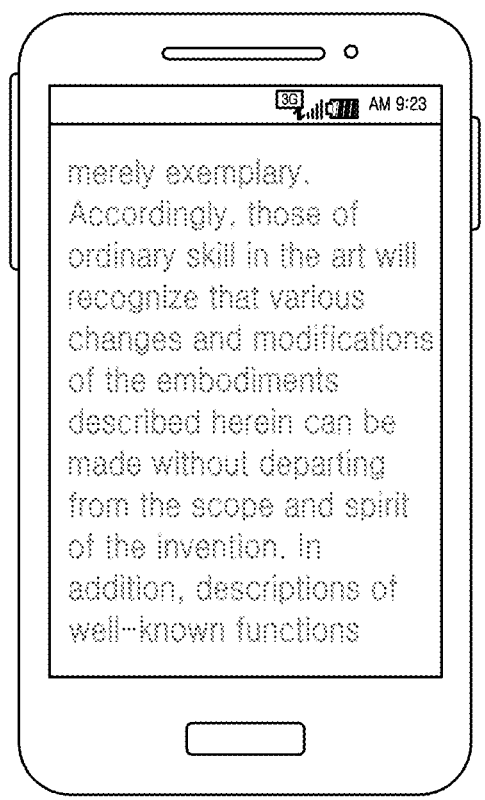

If a fixed scrolling direction is determined, the electronic device scrolls the screen in the fixed scroll direction based on the touch move distance in step 409. In this case, the electronic device scrolls the screen in the fixed scroll direction based on the touch move distance without considering the touch move direction. For example, the electronic device may scroll up the screen as shown in FIG. 5B in response to the touch move distance from point 501 to point 503 shown in FIG. 5A. Subsequently, if the touch point moves from point 503 to point 505 according to the touch move as shown in FIG. 5B, the electronic device may scroll up (the fixed scroll direction) the screen as shown in FIG. 5B, according to the touch move distance, as measured between points 503 and 505. Referring now to FIG. 5C, if the touch point moves from point 505 to point 507, the electronic device may scroll up (i.e., in accordance with the fixed scroll direction), with the results as shown in FIG. 5D, the scrolling distance correlating to the touch move distance between points 505 to 507. The electronic device may continue to scroll the screen according to continued touch move.

The electronic device checks whether the touch is released in step 411.

If the touch is not released, the electronic device scrolls the screen in the fixed scroll direction according to the touch move distance in step 409.

On the other hand, if the touch is released, the electronic device recognizes that a scroll operation is finished. Thus, the electronic device may terminate the present algorithm.

Figure 5E:
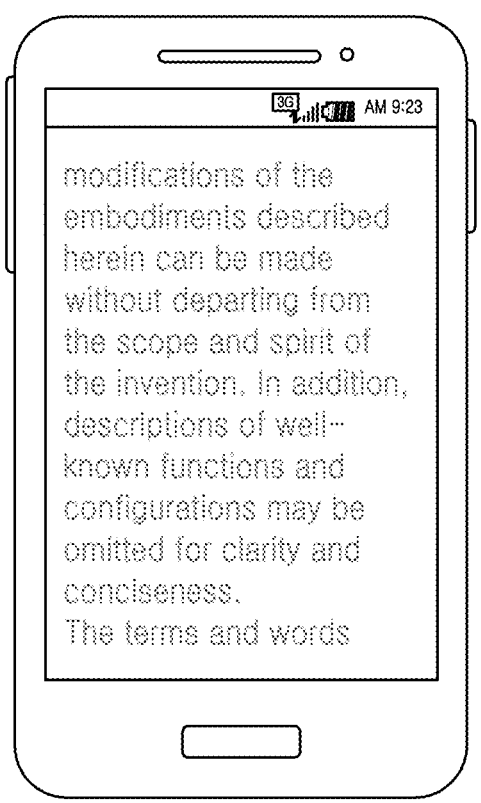

As described above, the electronic device may scroll the screen in the fixed scroll direction based on the touch move distance. In this case, the electronic device may determine a scroll control variable based on touch move information. For example, if the touch move is sensed, the electronic device determines the scroll control variable based on the touch move information. Subsequently, the electronic device scrolls the screen in the fixed scroll direction based on the scroll control variable and the touch move distance. As another example, the electronic device may change a scroll interval only when the touch move direction is switched. For example, if as shown in FIG. 5C, the touch move direction is switched to the reverse direction of the touch move direction as shown in FIG. 5B, the electronic device may switch pages of E-book content displayed on the screen, as shown in FIG. 5E, in response to switch of the touch move direction. Subsequently, the electronic device may also scroll up (i.e., the fixed scroll direction) according to the touch move distance from, for example, points 505 to 507 of FIG. 5C. In this example, the touch move information may include at least one of a touch move speed, an area where the touch move is sensed, and a touch move angle, and the scroll control variable may include at least one of a scroll interval and a scroll speed.

Figure 6:
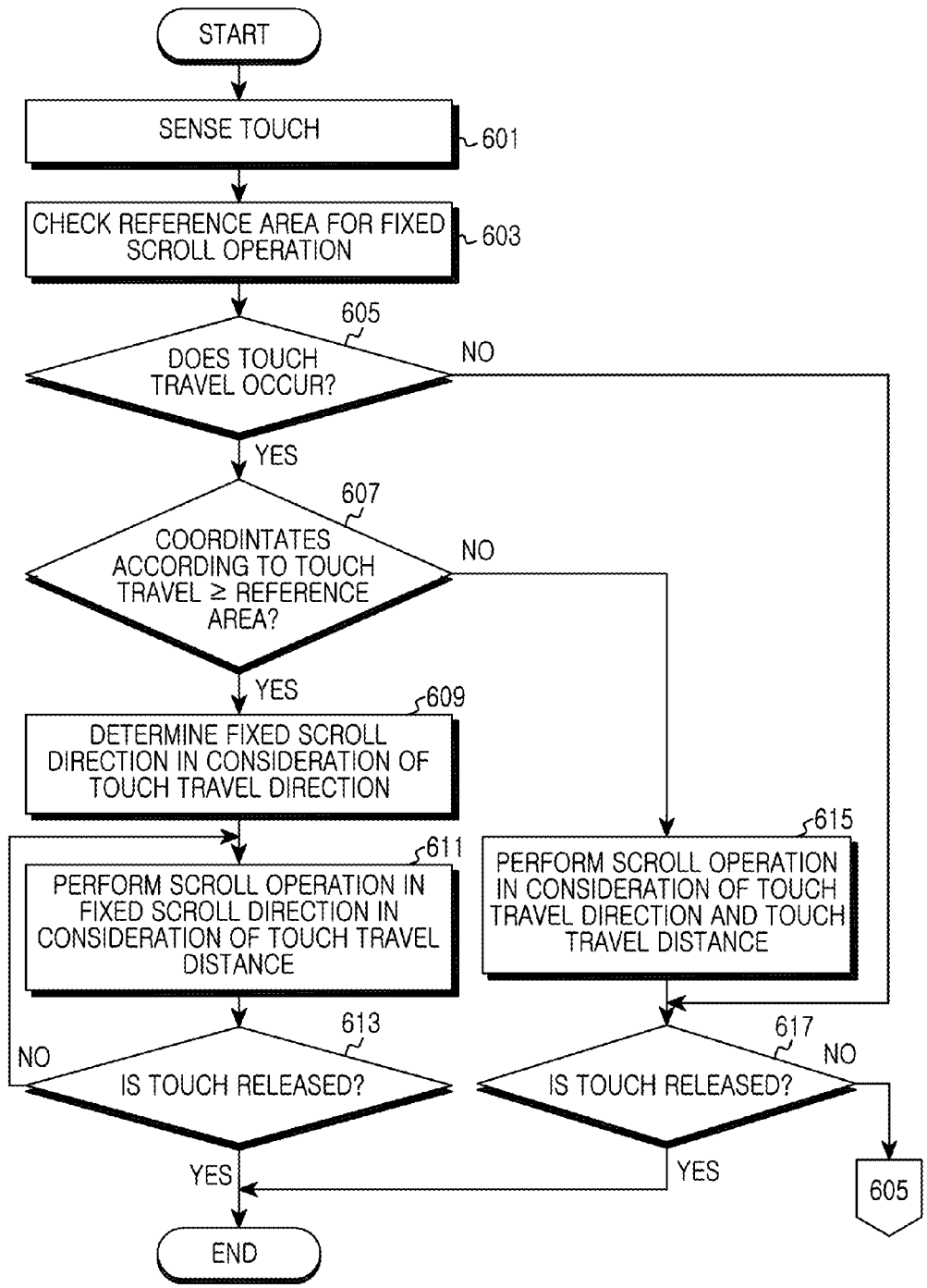
FIG. 6 is a flow chart of a procedure of scrolling a screen based on a touch move in an example electronic device according to an embodiment of the present invention.

FIG. 6 is a flow chart of a procedure of scrolling a screen based on a touch move in an electronic device according to a second embodiment of the present invention.

Referring to FIG. 6, the electronic device senses a touch in step 601. For example, the electronic device senses a touch by user's fingers or a touch pen through the touch pad of an input device 160.

Figure 7A:
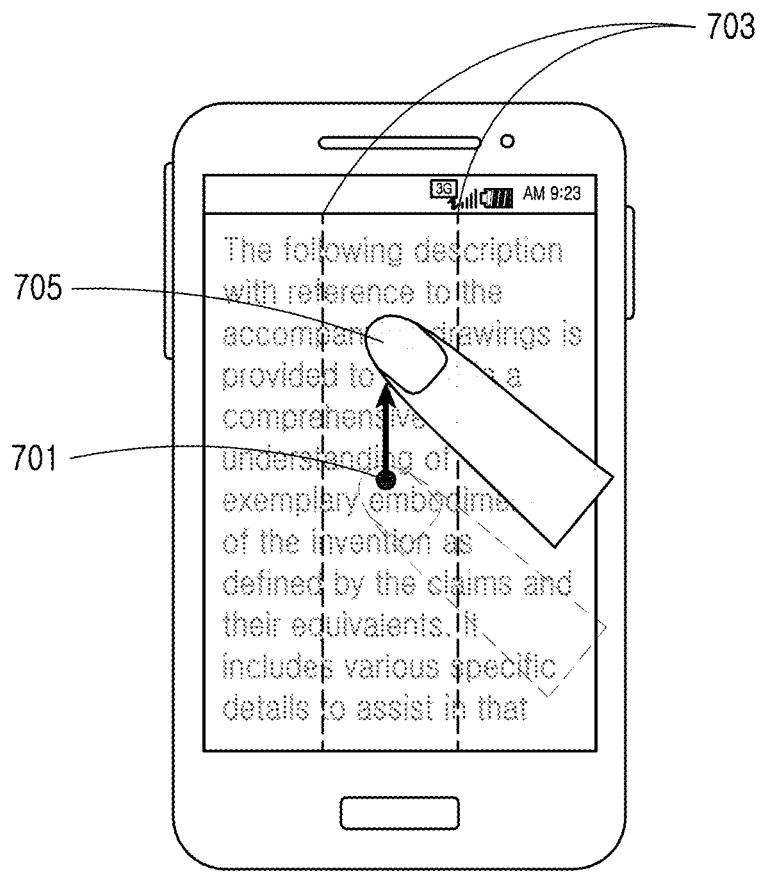
FIG. 7A and FIG. 7B illustrate screen configurations for scrolling a screen based on a touch move in an example electronic device according to an embodiment of the present invention.

If the touch is sensed, the electronic device determines a reference area for a fixed scroll operation based on a touch point in step 603. In this case, the electronic device determines the reference area based on a scrollable direction. For example, when a vertical scroll operation is performed, as shown in FIG. 7A, the electronic device may set a reference area 703 on a location spaced horizontally by a reference distance from a first touch point 701 where the touch is sensed. In this case, the reference area may be displayed on the display unit 150 so that it may be perceived by a user. In this example, the reference distance may be set based on the number of reference pixels or dots per inch (DPI).

If the reference area is identified, the electronic device checks whether a touch move is sensed in step 605.

If the touch move is not sensed, the electronic device checks whether a touch is released in step 617.

On the other hand, if the touch move is sensed in step 605, the electronic device checks whether the touch point moved out of the reference area in step 607. That is, the electronic device checks whether there is a fixed scroll switch event.

Figure 7B:
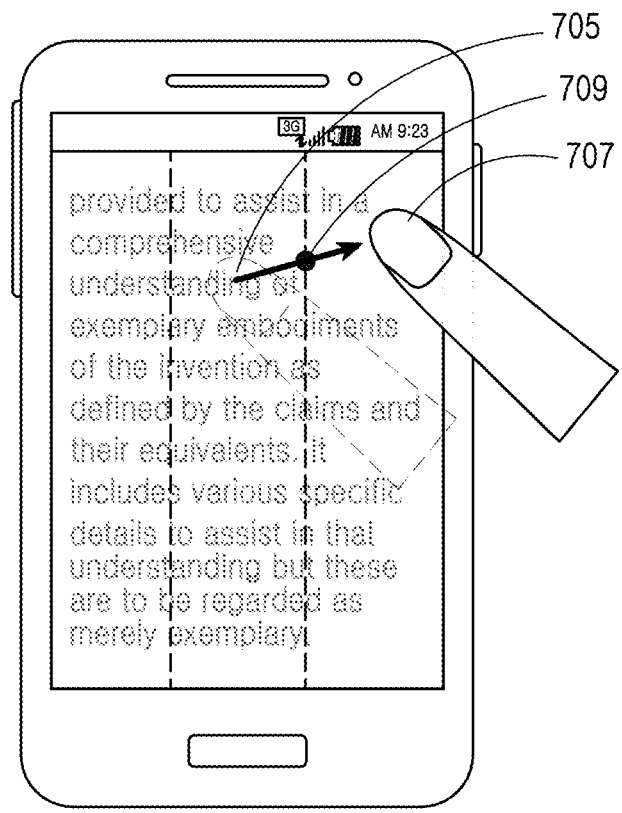

If the touch point did not move out of the reference area, the electronic device scrolls the screen based on the touch move direction and the touch move distance in step 615. For example, when the touch point various due to the touch move from 701 to 705 as shown in FIG. 7A does not get out of the reference area, the electronic device may scroll up the screen in the touch move direction according to the touch move distance from 701 to 705 as shown in FIG. 7B.

The electronic device checks whether the touch is released in step 617.

If the touch is released, the electronic device may terminate the present algorithm.

On the other hand, if the touch is not released in step 617, the electronic device checks whether the touch move is sensed in step 605.

On the other hand, if the touch point moves out of the reference area, the electronic device switches a scroll mode to the fixed scroll mode. Thus, the electronic device determines a fixed scroll direction based on the touch move direction in step 609. That is, the electronic device determines the fixed scroll direction based on a scroll direction taken before the touch point gets out of the reference area. For example, when the touch point moves due to the touch move from point 705 to point 707 out of the reference area 709, as shown in FIG. 7B, the electronic device may determine, as the fixed scroll direction, the scroll direction indicated immediately before the touch point moved out of the reference area (which, in the example of FIGS. 7A and 7B, would be a scroll up).

If the fixed scrolling direction is determined, the electronic device scrolls the screen in the fixed scroll direction based on the touch move distance in step 611. In this case, the electronic device scrolls the screen in the fixed scroll direction based on the touch move distance without considering the touch move direction (as previously shown in FIGS. 5B-5D).

The electronic device checks whether the touch is released in step 613.

If the touch is not released, the electronic device scrolls the screen in the fixed scroll direction according to the touch move distance in step 611.

On the other hand, if the touch is released, the electronic device recognizes that a fixed scroll operation is finished. Thus, the electronic device may terminate the present algorithm.

As described above, the electronic device may scroll the screen in the fixed scroll direction based on the touch move distance. In this case, the electronic device may determine a scroll control variable based on touch move information. For example, if the touch move is sensed, the electronic device determines the scroll control variable based on the touch move information. Subsequently, the electronic device scrolls the screen in the fixed scroll direction based on the scroll control variable and the touch move distance. In this example, the touch move information may include at least one of a touch move speed, an area where the touch move is sensed, and a touch move angle, and the scroll control variable may include at least one of a scroll interval and a scroll speed.

In the above-described embodiment, if the touch point moves out of the reference area, the electronic device may determine the fixed scroll direction in step 609. That is, the electronic device switches the scroll mode to the fixed scroll mode and may then determine the fixed scroll direction.

In another embodiment, the electronic device may determine a scroll direction before the touch point moves out of the reference area. That is, the electronic device may also determine a fixed scroll direction before switching a scroll mode to a fixed scroll mode. For example, if the screen is scrolled according to the touch move in the reference area, as in step 615, the electronic device may determine the scroll direction of the screen as the fixed scroll direction. In this case, if the scroll direction of the screen varies, the electronic device updates the fixed scroll direction according to the varied scroll direction of the screen.

Figure 8:
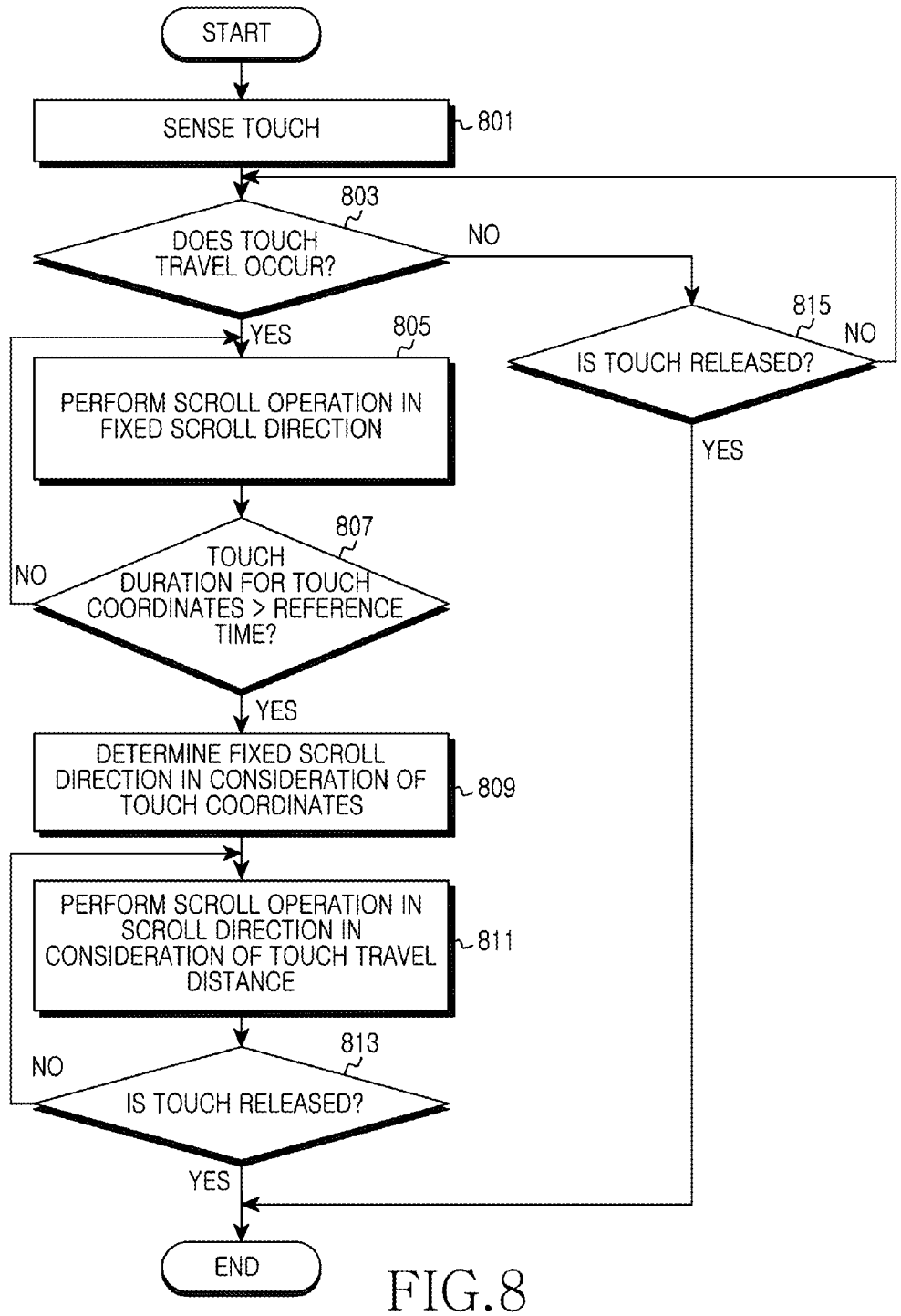
FIG. 8 is a flow chart of a procedure of scrolling a screen based on a touch move in an example electronic device according to an embodiment of the present invention.

FIG. 8 is a flow chart of a procedure of scrolling a screen based on a touch move in an electronic device according to a third embodiment of the present invention.

Referring to FIG. 8, the electronic device senses a touch in step 801. For example, the electronic device senses a touch by user's fingers or a touch pen through the touch pad of an input device 160.

If the touch is sensed, the electronic device checks whether a touch move is sensed in step 803.

If the touch move is not sensed, the electronic device checks whether a touch is released in step 815.

If the touch is released, the electronic device recognizes that a scroll operation is not performed. Thus, the electronic device may terminate the present algorithm.

On the other hand, if the touch is not released, the electronic device checks whether the touch move is sensed in step 803.

Figure 9A:
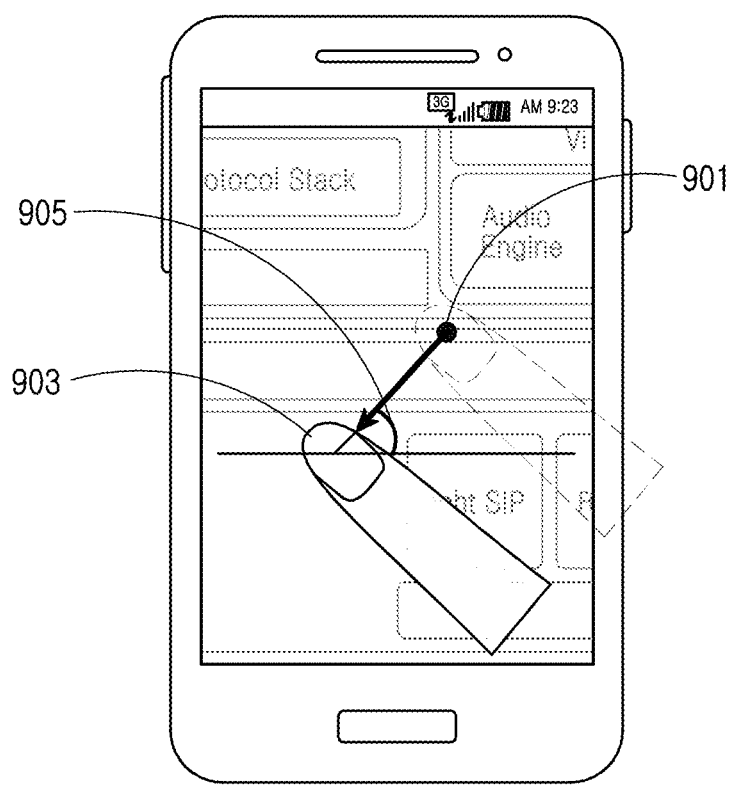
FIG. 9A, FIG. 9B, FIG. 9C and FIG. 9D illustrate screen configurations for scrolling a screen based on a touch move in an example electronic device according to an embodiment of the present invention.

On the other hand, if the touch move is sensed in step 803, the electronic device scrolls a screen based on a touch move direction and a touch move distance in step 805. For example, if the touch move is sensed as shown in FIG. 9A, the electronic device may scroll the screen in the touch move direction according to the touch move distance from point 901 to point 903 as shown in FIG. 9A.

The electronic device checks whether a touch duration for a touch point exceeds a reference time in step 807. For example, the electronic device checks whether a time duration for a second touch point 903 as shown in FIG. 9A exceeds the reference time. That is, the electronic device checks whether there is a fixed scroll switch event.

If the touch duration for the touch point does not exceed the reference time, the electronic device scrolls the screen based on the touch move direction and the touch move distance in step 805.

On the other hand, if the touch duration for the touch point exceeds the reference time, the electronic device switches a scroll mode to a fixed scroll mode. Thus, the electronic device determines a fixed scroll direction based on the touch point that was maintained exceeding the reference time in step 809. For example, if the touch duration for the second touch point 903 as shown in FIG. 9A exceeds the reference time, the electronic device may determine the fixed scroll direction is the direction of the second touch point 903 relative to the first touch point 901. That is, the electronic device may determine the fixed scroll direction based on the angle 905 depicted, as determined from a line drawn between the first touch point 901 and the second touch point 903.

Figure 9B:
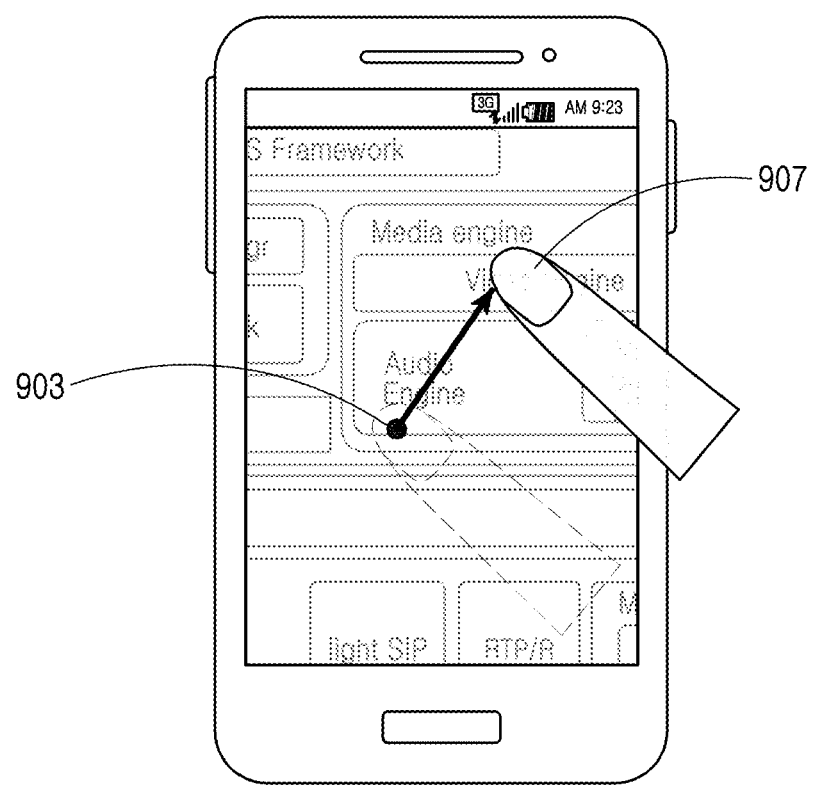
Figure 9C:
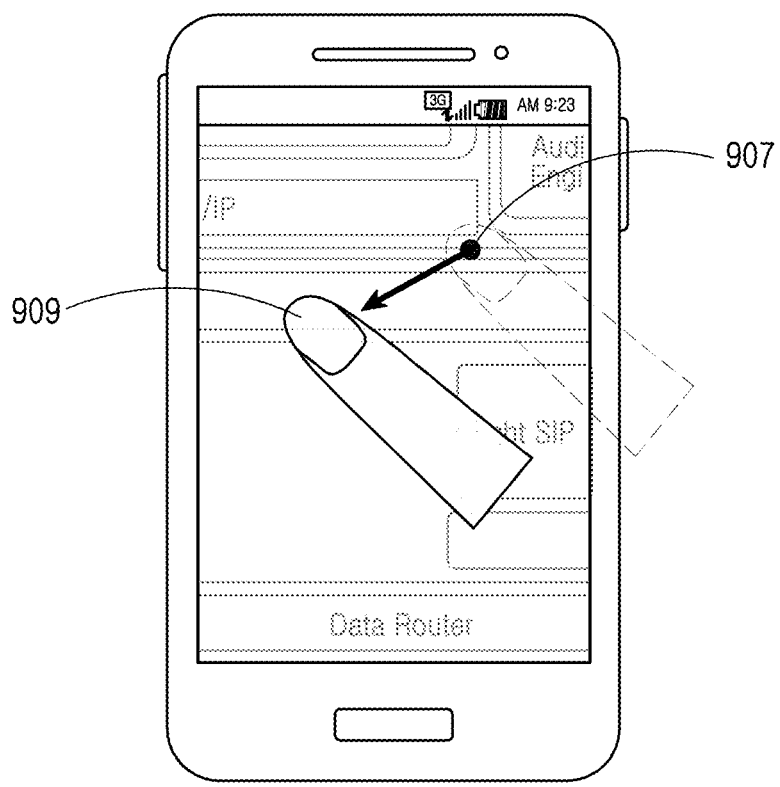
Figure 9D:
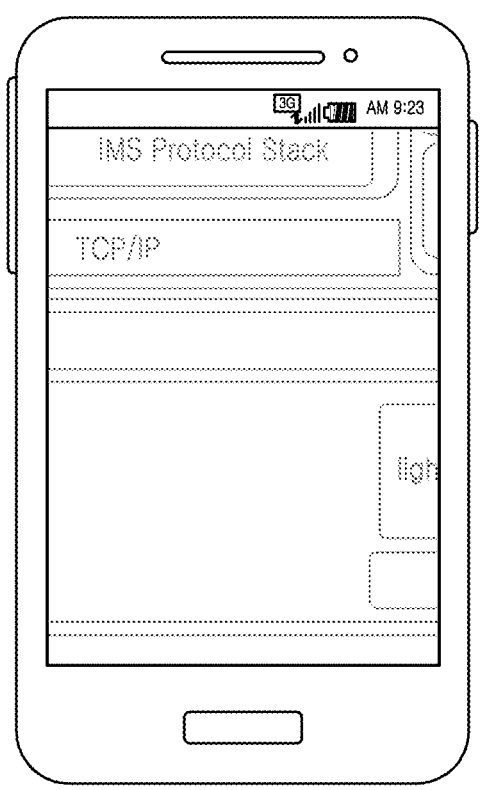

If the fixed scroll direction is determined, the electronic device scrolls the screen in the fixed scroll direction according to the touch move distance in step 811. In this case, the electronic device scrolls the screen in the fixed scroll direction based on the touch move distance without considering the touch move direction. For example, if the touch point varies from 903 to 907 according to the touch move as shown in FIG. 9B, the electronic device may scroll the screen in the fixed scroll direction based on the angle 905 as shown in FIG. 9A. Similarly, if the touch point varies from 907 to 909 according to the touch move as shown in FIG. 9C, the electronic device may scroll the screen in the fixed scroll direction based on angle 905 as shown in FIG. 9A. In this case, the electronic device may continue to scroll the screen according to the touch move.

The electronic device checks whether the touch is released in step 813.

If the touch is not released, the electronic device scrolls the screen in the fixed scroll direction according to the touch move distance in step 811.

On the other hand, if the touch is released, the electronic device recognizes that a fixed scroll operation is finished. Thus, the electronic device may terminate the present algorithm.

As described above, the electronic device may scroll the screen in the fixed scroll direction based on the touch move distance. In this case, the electronic device may determine a scroll control variable based on touch move information. For example, if the touch move is sensed, the electronic device determines the scroll control variable based on the touch move information. Subsequently, the electronic device scrolls the screen in the fixed scroll direction based on the scroll control variable and the touch move distance. In this example, the touch move information may include at least one of a touch move speed, an area where the touch move is sensed, and a touch move angle, and the scroll control variable may include at least one of a scroll interval and a scroll speed.

In the above-described embodiment, if the time durations for the first touch point where the touch is sensed and another touch point exceed the reference time, the electronic device may switch to the fixed scroll mode.

In another embodiment, if the time duration for the first touch point where the touch is sensed exceeds the reference time, the electronic device may also switch to the fixed scroll mode. In this case, the electronic device may determine the fixed scroll direction based on the angle between a preset reference point and a first touch point.

Figure 10:
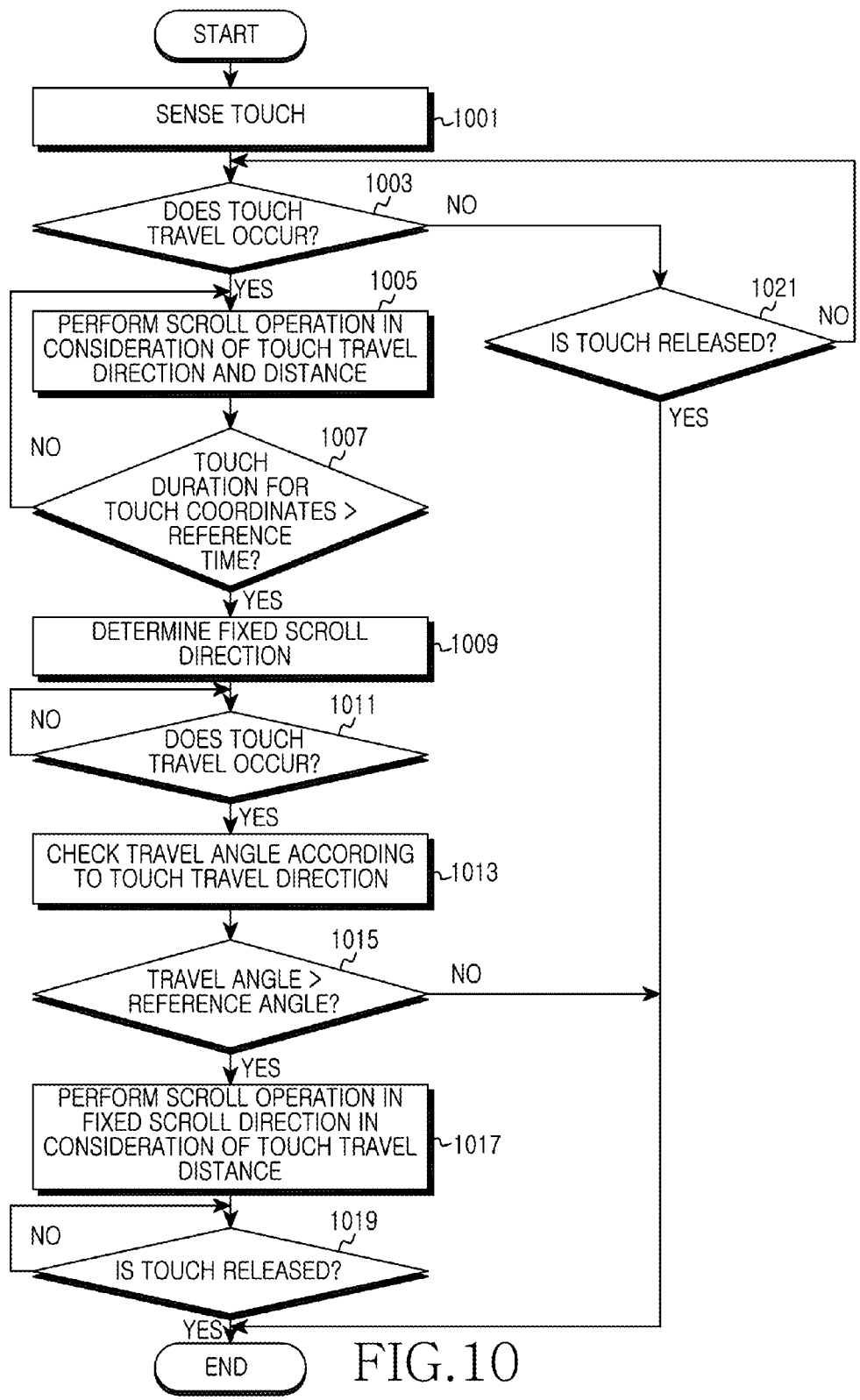
FIG. 10 is a flow chart of a procedure of scrolling a screen based on a touch move in an example electronic device according to an embodiment of the present invention.

FIG. 10 is a flow chart of a procedure of scrolling a screen based on a touch move in an electronic device according to a fourth embodiment of the present invention.

Referring to FIG. 10, the electronic device senses a touch in step 1001. For example, the electronic device senses a touch by user's fingers or a touch pen through the touch pad of an input device 160.

If the touch is sensed, the electronic device checks whether a touch move is sensed in step 1003.

If the touch move is not sensed, the electronic device checks whether a touch is released in step 1021.

If the touch is released, the electronic device recognizes that a scroll operation is not performed. Thus, the electronic device may terminate the present algorithm.

On the other hand, if the touch is not released, the electronic device checks whether the touch move is sensed in step 1003.

Figure 11:
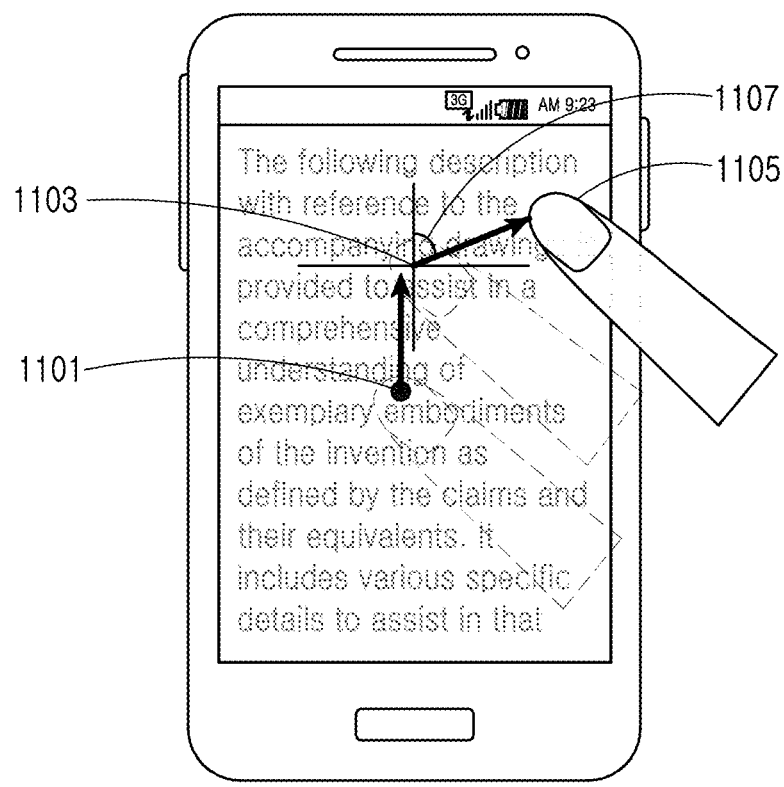
FIG. 11 illustrates a screen configuration for scrolling a screen based on a touch move in an example electronic device according to an embodiment of the present invention.

On the other hand, if the touch move is sensed in step 1003, the electronic device scrolls a screen based on a touch move direction and a touch move distance in step 1005. For example, if the touch move is sensed as shown in FIG. 11, the electronic device may scroll up the screen in the touch move direction based on the touch move distance from 1101 to 1103.

Subsequently, the electronic device checks whether a touch duration for a touch point exceeds a reference time in step 1007. For example, the electronic device checks whether a time duration for a second touch point 1103 as shown in FIG. 11 exceeds the reference time. That is, the electronic device checks whether there is a fixed scroll switch event.

If the touch duration for the touch point does not exceed the reference time, the electronic device scrolls the screen based on the touch move direction and the touch move distance in step 1105.

On the other hand, if the touch duration for the touch point exceeds the reference time, the electronic device switches a scroll mode to a fixed scroll mode. Thus, the electronic device determines a fixed scroll direction in step 1109. For example, the electronic device may determine a fixed scroll direction based on a touch point where a touch is maintained to exceed the reference time. In particular, if the touch duration for the second touch point 1103 as shown in FIG. 11 exceeds the reference time, the electronic device may determine the fixed scroll direction based on the direction of the second touch point 1103 relative to the first touch point 1101. As another example, the electronic device may also determine the fixed scroll direction based on a scroll direction taken before the touch duration exceeds the reference time. In particular, if the touch duration for the second touch point 1103 as shown in FIG. 11 exceeds the reference time, the electronic device may also determine the fixed scroll direction based on a scroll direction varied due to the touch move to the second touch point 1103.

The electronic device checks whether touch move is sensed in step 1011. For example, if the touch duration for the second touch point 1103 as shown in FIG. 11 exceeds the reference time, the electronic device checks whether the touch move from the second touch point 1103 is sensed. Although not shown, the electronic device may also terminate the present algorithm if the touch is released before the touch move is sensed.

If the touch move is sensed, the electronic device checks the angle of the touch move direction relative to the fixed scroll direction in step 1013. For example, if the touch move from the second touch point 1103 is sensed as shown in FIG. 11, the electronic device checks the angle 1107 of a third touch point 1105 relative to the fixed scroll direction.

If the angle of the touch move direction is checked, the electronic device checks whether the angle of the touch move direction exceeds a reference angle in step 1015.

When the angle of the touch move direction is equal to or smaller than the reference angle, the electronic device recognizes that a fixed scroll operation is not performed. Thus, the electronic device may terminate the present algorithm.

On the other hand, if the angle of the touch move direction exceeds the reference angle, the electronic device scrolls the screen in the fixed scroll direction according to the touch move distance in step 1017. In this case, the electronic device scrolls the screen in the fixed scroll direction based on the touch move distance without considering the touch move direction (as shown earlier in FIGS. 5B to 5D).

Subsequently, the electronic device checks whether the touch is released in step 1019.

If the touch is not released, the electronic device scrolls the screen in the fixed scroll direction according to the touch move distance in step 1017.

On the other hand, if the touch is released, the electronic device recognizes that a fixed scroll operation is finished. Thus, the electronic device may terminate the present algorithm.

As described above, the electronic device may scroll the screen in the fixed scroll direction based on the touch move distance. In this case, the electronic device may determine a scroll control variable based on touch move information. For example, if the touch move is sensed, the electronic device determines the scroll control variable based on the touch move information. Subsequently, the electronic device scrolls the screen in the fixed scroll direction based on the scroll control variable and the touch move distance. In this example, the touch move information may include at least one of a touch move speed, an area where the touch move is sensed, and a touch move angle, and the scroll control variable may include at least one of a scroll interval and a scroll speed.

In the above-described embodiment, if the angle of the touch move direction is smaller than or equal to the reference angle, the electronic device may terminate the present algorithm.

In another embodiment, if the angle of the touch move direction is smaller than or equal to the reference angle, the electronic device may also check whether the touch is released. If the touch is not released, the electronic device may also check whether the touch move is sensed in step 1011, in order to check whether it is possible to perform a fixed scroll operation.

It will be appreciated that embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing device or a method as claimed in any one of the claims of this specification and a machine-readable storage storing such a program. Still further, such programs may be conveyed electronically via any medium such as a communication signal carried over a wired or wireless connection and embodiments suitably encompass the same.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

As described above, it is possible to simplify a user input procedure for scrolling the screen because the screen is scrolled in a fixed direction based on a touch move distance in an electronic device including a touch screen.

While particular embodiments have been described in the detailed description of the present invention, several variations may be made without departing from the scope of the present invention. Therefore, the scope of the present invention should not be limited to the above-described embodiments but be defined by the following claims and equivalents thereof.

What is claimed is:

1. A method for scrolling a display image of a touchscreen, the method comprising:
   setting a scroll direction based on a first touch movement direction; and
   scrolling the display image in the scroll direction, based on a second touch movement distance, irrespective of a second touch movement direction,
   wherein setting the scroll direction further includes setting a reference area of the touchscreen based on a first touch input location and setting the scroll direction in response to the first touch movement of the first touch input beyond the reference area, and
   wherein the second touch movement includes a movement of the first touch input from a time point out of the reference area.

2. The method of claim 1, wherein the scroll direction is based on the first touch movement direction immediately before the first touch input location moves beyond the reference area.

3. The method of claim 1, wherein the setting the reference area comprises setting the reference area according to a reference distance as measured from the first touch input location.

4. The method of claim 1, further comprising:
   detecting touch move information including at least one of a first touch movement speed, a first touch movement angle, and a first touch input location; and setting a scroll control variable including at least one of a scroll interval, and a scroll speed, the scroll control variable based on the touch move information, wherein the display image is scrolled according to the touch move distance and the scroll control variable.

5. The method of claim 1, further comprising setting a scroll interval as a full page in response to a reversal of the second touch movement direction relative to the first touch movement direction.

6. The method of claim 1, further comprising scrolling the touchscreen in the first scroll direction based on a page based scroll interval if a touch travel direction is switched to a reverse direction.

7. An electronic device comprising:
a touch screen configured to display a display image; and
at least one processor configured to:
  set a scroll direction based on a first touch movement direction; and
  scroll the display image in the scroll direction, based on a second touch movement distance, irrespective of a second touch movement,
wherein setting the scroll direction further includes setting a reference area based on a first touch input location, and setting the scroll direction in response to the first touch movement of the first touch input beyond the reference area, and
wherein the second touch movement includes a movement of the first touch input from a time point out of the reference area.

8. The electronic device of claim 7, wherein the processor is configured to set the scroll direction as the first touch movement direction as detected immediately before the first touch location moves out of the reference area.

9. The electronic device of claim 7, wherein the processor is configured to set the reference area according to a reference distance as measured from the first touch input location.

10. The electronic device of claim 7, wherein the processor is configured to:
  detect touch move information including at least one of a first touch movement speed, a first touch movement angle, and a first touch input location; and
  setting a scroll control variable including at least one of a scroll interval, and a scroll speed, the scroll control variable based on the touch move information,
wherein the display image is scrolled according to the touch move distance and the scroll control variable.

11. The electronic device of claim 7, wherein the processor is configured to set a scroll interval as a full page in response to a reversal of the second touch movement direction relative to the first touch movement direction.

12. The electronic device of claim 7, wherein the processor is configured to scroll the screen in the first scroll direction based on a page based scroll interval if a touch travel direction is switched to a reverse direction.

* * * * *